(12) United States Patent
Liu et al.

(10) Patent No.: US 8,091,142 B2
(45) Date of Patent: Jan. 3, 2012

(54) SUPPLEMENTARY TRUST MODEL FOR SOFTWARE LICENSING/COMMERCIAL DIGITAL DISTRIBUTION POLICY

(75) Inventors: Yeu Liu, Issaquah, WA (US); Ravi Pandya, Clyde Hill, WA (US); Lazar Ivanov, Seattle, WA (US); Muthukrishnan Paramasivam, Seattle, WA (US); Caglar Gunyakti, Sammamish, WA (US); Dongmei Gui, Redmond, WA (US); Scott W. P. Hsu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1155 days.

(21) Appl. No.: 11/114,509

(22) Filed: Apr. 26, 2005

(65) Prior Publication Data

US 2006/0242081 A1 Oct. 26, 2006

(51) Int. Cl.
*G06F 7/04* (2006.01)
*G06F 17/30* (2006.01)
*G06F 21/00* (2006.01)
*G06F 21/20* (2006.01)

(52) U.S. Cl. .............. 726/30; 726/26; 726/27; 726/2; 726/3; 726/21; 713/187; 713/189; 705/59; 705/51; 705/52

(58) Field of Classification Search .................. None
See application file for complete search history.

(56) References Cited

U.S. PATENT DOCUMENTS

| | | | |
|---|---|---|---|
| 3,718,906 A | 2/1973 | Lightner | 340/147 R |
| 4,323,921 A | 4/1982 | Guillou | 358/114 |
| 4,528,643 A | 7/1985 | Freeny, Jr. | 364/900 |
| 4,658,093 A | 4/1987 | Hellman | 380/25 |
| 4,683,553 A | 7/1987 | Mollier | 380/4 |
| 4,827,508 A | 5/1989 | Shear | 380/4 |
| 4,916,738 A | 4/1990 | Chandra et al. | 380/25 |
| 4,926,479 A | 5/1990 | Goldwasser et al. | 380/23 |
| 4,953,209 A | 8/1990 | Ryder, Sr. et al. | 380/23 |
| 4,977,594 A | 12/1990 | Shear | 380/4 |
| 5,050,213 A | 9/1991 | Shear | 380/25 |
| 5,103,392 A | 4/1992 | Mori | 395/725 |
| 5,103,476 A | 4/1992 | Waite et al. | 380/4 |
| 5,109,413 A | 4/1992 | Comerford et al. | 380/4 |
| 5,117,457 A | 5/1992 | Comerford et al. | 380/3 |

(Continued)

FOREIGN PATENT DOCUMENTS

CN 1500242 5/2004

(Continued)

OTHER PUBLICATIONS

"Aladdin Knowledge Systems Partners with Rights Exchange, Inc. to Develop a Comprehensive Solution for Electronic Software Distribution," Aug. 3, 1988, 5 pages.

(Continued)

*Primary Examiner* — Syed A. Zia
(74) *Attorney, Agent, or Firm* — Woodcock Washburn LLP

(57) ABSTRACT

A flexible use licensing system for an application comprising a plurality of licensable products is provided comprising an application level product policy definition license, and a licensable product policy definition license corresponding to each licensable product. The flexible use license further comprises a rights account certificate for validating the use license against a variety of environmental conditions, and an external validation component for validating the use license at a licensing authority without the transmittal of the entire use license.

15 Claims, 6 Drawing Sheets

U.S. PATENT DOCUMENTS

| | | | | |
|---|---|---|---|---|
| 5,193,573 | A | 3/1993 | Chronister | 137/315 |
| 5,222,134 | A | 6/1993 | Waite et al. | 380/4 |
| 5,261,002 | A | 11/1993 | Perlman et al. | 380/30 |
| 5,319,705 | A | 6/1994 | Halter et al. | 380/4 |
| 5,410,598 | A | 4/1995 | Shear | 380/4 |
| 5,473,692 | A | 12/1995 | Davis | 380/25 |
| 5,490,216 | A | 2/1996 | Richardson, III | 380/4 |
| 5,509,070 | A | 4/1996 | Schull | 380/4 |
| 5,629,980 | A | 5/1997 | Stefik et al. | 380/4 |
| 5,634,012 | A | 5/1997 | Stefik et al. | 395/239 |
| 5,638,443 | A | 6/1997 | Stefik et al. | 380/4 |
| 5,673,316 | A | 9/1997 | Auerbach et al. | 380/4 |
| 5,710,887 | A | 1/1998 | Chelliah et al. | 395/226 |
| 5,715,403 | A | 2/1998 | Stefik | 395/244 |
| 5,745,879 | A | 4/1998 | Wyman | |
| 5,765,152 | A | 6/1998 | Erickson | 707/9 |
| 5,809,144 | A | 9/1998 | Sirbu et al. | 380/25 |
| 5,835,911 | A | 11/1998 | Nakagawa et al. | |
| 5,845,281 | A | 12/1998 | Benson et al. | 707/9 |
| 5,892,900 | A | 4/1999 | Ginter et al. | 395/186 |
| 5,917,912 | A | 6/1999 | Ginter et al. | 380/24 |
| 5,933,646 | A | 8/1999 | Hendrickson et al. | |
| 5,953,420 | A | 9/1999 | Matyas, Jr. et al. | 380/21 |
| 5,956,505 | A | 9/1999 | Manduley | |
| 5,982,891 | A | 11/1999 | Ginter et al. | |
| 5,984,508 | A | 11/1999 | Hurley | |
| 6,073,124 | A | 6/2000 | Krishnan et al. | 705/59 |
| 6,078,909 | A | 6/2000 | Knutson | 705/59 |
| 6,094,487 | A | 7/2000 | Butler et al. | 380/270 |
| 6,189,146 | B1 | 2/2001 | Misra et al. | 717/11 |
| 6,195,432 | B1 | 2/2001 | Takahashi et al. | |
| 6,219,652 | B1 | 4/2001 | Carter et al. | 705/59 |
| 6,226,618 | B1 | 5/2001 | Downs et al. | 705/1 |
| 6,233,567 | B1 | 5/2001 | Cohen | 705/59 |
| 6,243,480 | B1 | 6/2001 | Zhao et al. | |
| 6,289,452 | B1 | 9/2001 | Arnold et al. | 713/175 |
| 6,330,670 | B1 | 12/2001 | England et al. | 713/2 |
| 6,343,280 | B2 | 1/2002 | Clark | 705/55 |
| 6,389,538 | B1* | 5/2002 | Gruse et al. | 713/194 |
| 6,574,609 | B1 | 6/2003 | Downs et al. | 705/50 |
| 6,574,612 | B1 | 6/2003 | Baratti et al. | 705/59 |
| 6,681,017 | B1 | 1/2004 | Matias et al. | 380/277 |
| 6,810,389 | B1* | 10/2004 | Meyer | 705/59 |
| 6,832,319 | B1 | 12/2004 | Bell et al. | 713/193 |
| 7,069,595 | B2* | 6/2006 | Cognigni et al. | 726/26 |
| 7,149,721 | B1 | 12/2006 | Sites et al. | |
| 7,225,165 | B1 | 5/2007 | Kyojima et al. | |
| 7,249,382 | B2 | 7/2007 | Kawell et al. | |
| 7,266,513 | B2 | 9/2007 | Chalmers et al. | |
| 7,516,327 | B2 | 4/2009 | Kawell et al. | |
| 7,516,452 | B1* | 4/2009 | Vook et al. | 717/174 |
| 7,523,071 | B2* | 4/2009 | Fox et al. | 705/52 |
| 7,552,093 | B2* | 6/2009 | Levin et al. | 705/59 |
| 7,716,348 | B1* | 5/2010 | Redding et al. | 709/249 |
| 7,805,616 | B1* | 9/2010 | Mohammed et al. | 713/189 |
| 7,831,457 | B2* | 11/2010 | Varadarajan et al. | 705/7.22 |
| 7,840,488 | B2* | 11/2010 | Tieu et al. | 705/51 |
| 7,860,802 | B2 | 12/2010 | Pandya et al. | |
| 7,890,428 | B2 | 2/2011 | Brooks et al. | |
| 7,970,709 | B2* | 6/2011 | Stefik et al. | 705/59 |
| 2001/0052077 | A1 | 12/2001 | Fung et al. | 713/184 |
| 2001/0056539 | A1 | 12/2001 | Pavlin et al. | 713/193 |
| 2002/0006204 | A1 | 1/2002 | England et al. | |
| 2002/0007456 | A1 | 1/2002 | Peinado et al. | |
| 2002/0012432 | A1 | 1/2002 | England et al. | |
| 2002/0013772 | A1 | 1/2002 | Peinado | 705/51 |
| 2002/0019814 | A1 | 2/2002 | Ganesan | |
| 2002/0099663 | A1 | 7/2002 | Yoshino et al. | |
| 2002/0136407 | A1 | 9/2002 | Denning et al. | |
| 2002/0138735 | A1 | 9/2002 | Felt et al. | |
| 2002/0138745 | A1 | 9/2002 | Cognigni et al. | |
| 2002/0141582 | A1 | 10/2002 | Kocher et al. | |
| 2002/0146121 | A1 | 10/2002 | Cohen | |
| 2002/0169974 | A1 | 11/2002 | McKune | |
| 2002/0174356 | A1* | 11/2002 | Padole et al. | 713/200 |
| 2003/0007646 | A1 | 1/2003 | Hurst et al. | |
| 2003/0014655 | A1 | 1/2003 | England et al. | |
| 2003/0028488 | A1 | 2/2003 | Mohammed et al. | |
| 2003/0078853 | A1 | 4/2003 | Peinado et al. | |
| 2003/0081785 | A1 | 5/2003 | Boneh et al. | |
| 2003/0084306 | A1 | 5/2003 | Abburi et al. | |
| 2003/0182236 | A1 | 9/2003 | Tanaka et al. | |
| 2003/0187801 | A1 | 10/2003 | Chase et al. | |
| 2003/0194092 | A1 | 10/2003 | Parks et al. | |
| 2003/0194094 | A1 | 10/2003 | Lampson et al. | 380/282 |
| 2003/0195855 | A1 | 10/2003 | Parks et al. | |
| 2003/0217011 | A1 | 11/2003 | Peinado et al. | |
| 2003/0233573 | A1 | 12/2003 | Phinney | |
| 2003/0236978 | A1 | 12/2003 | Evans et al. | |
| 2004/0001594 | A1 | 1/2004 | Krishnaswamy et al. | |
| 2004/0027377 | A1 | 2/2004 | Hays et al. | |
| 2004/0044629 | A1 | 3/2004 | Rhodes et al. | |
| 2004/0054930 | A1* | 3/2004 | Walker et al. | 713/202 |
| 2004/0088541 | A1 | 5/2004 | Messerges et al. | |
| 2004/0088730 | A1* | 5/2004 | Gopalan et al. | 725/93 |
| 2004/0193545 | A1* | 9/2004 | Shlasky | 705/59 |
| 2005/0044367 | A1 | 2/2005 | Gasparini et al. | |
| 2005/0132347 | A1* | 6/2005 | Harper et al. | 717/168 |
| 2005/0165686 | A1* | 7/2005 | Zack et al. | 705/51 |
| 2005/0216420 | A1* | 9/2005 | Padole et al. | 705/59 |
| 2005/0246286 | A1* | 11/2005 | Ebihara et al. | 705/59 |
| 2005/0289072 | A1* | 12/2005 | Sabharwal | 705/59 |
| 2007/0005504 | A1* | 1/2007 | Chen et al. | 705/59 |

FOREIGN PATENT DOCUMENTS

| | | |
|---|---|---|
| EP | 0 715 246 B1 | 6/1996 |
| EP | 0 715 247 B1 | 6/1996 |
| EP | 1 076 279 A1 | 2/2001 |
| EP | 1 376 305 A2 | 1/2004 |
| JP | 2004-280791 A | 10/2004 |
| KR | 2000-0036345 A | 7/2000 |
| KR | 2004-0038456 A | 5/2004 |
| RU | 2236037 | 9/2004 |
| WO | WO 93/01550 A1 | 1/1993 |
| WO | WO 96/13013 A1 | 5/1996 |
| WO | WO 96/24092 A3 | 8/1996 |
| WO | WO 96/27155 A2 | 9/1996 |
| WO | WO 97/25798 A1 | 7/1997 |
| WO | WO 97/43761 A2 | 11/1997 |
| WO | WO 98/09209 A1 | 3/1998 |
| WO | WO 98/10381 A1 | 3/1998 |
| WO | WO 98/21679 A1 | 5/1998 |
| WO | WO 98/24037 A1 | 6/1998 |
| WO | WO 98/37481 A1 | 8/1998 |
| WO | WO 99/17496 | 4/1999 |
| WO | WO 00/15221 A1 | 3/2000 |
| WO | WO 00/58811 A3 | 10/2000 |
| WO | WO 00/59150 A2 | 10/2000 |
| WO | WO 01/41027 A1 | 6/2001 |
| WO | WO 01/77795 A2 | 10/2001 |
| WO | WO 2004/019182 | 3/2004 |
| WO | WO 2004019182 | 3/2004 |
| WO | WO 2004/092933 A1 | 10/2004 |
| WO | WO 2004092933 A1 * | 10/2004 |

OTHER PUBLICATIONS

Armati, D., "Tools and standards for protection, control and presentation of data," Apr. 3, 1996, 17 pages.

Benjamin, R. et al., "Electronic markets and virtual value chains on the information superhighway," *Sloan Management Rev.*, Winter, 1995, 62-72.

Cassidy, "A Web developers guide to content encapsulation technology," Apr. 1997, 5 pages.

Cox, B., "Superdistribution," *Idees Fortes*, Sep. 1994, 2 pages.

Cox, B., "What if There is a Silver Bullet," *J. Object Oriented Programm.*, Jun. 1992, 8-9 and 76.

Griswold, G.N., "A Method for Protecting Copyright on Networks," *IMA Intell. Property Project Proceedings*, Jan. 1994, 1(1), 169-178.

Hauser, R.C., "Does licensing require new access control techniques?" Aug. 1993, 9 pages.

Hudgins-Bonafield, C. "Selling Knowledge on the Net," *Network Computing*, Jun. 1, 1995, 102-109.

"IBM spearheading intellectual property protection technology for information on the Internet," May 1996, 3 pages.

"Technological Solutions Rise to Complement Law's Small Stick Guarding Electronic Works," *Information Law Alert*, Jun. 16, 1995, 3-4 and 7.

Kaplan, M.A., "IBM Cryptolopes_, Super-Distribution and Digital Rights Management," Dec. 1996, 7 pages.

Kent, S.T., "Protecting externally supplied software in small computers," Sep. 1980, 1-42 and 250-252.

Kohl, U. et al., "Safeguarding Digital Library Contents and Users; Protecting Documents Rather Than Channels," *D-Lib Magazine*, Sep. 1997, 9 pages.

Linn, R.J., "Copyright and Information Services in the Context of the National Research and Education Network," *IMA Intell. Property Project Proceedings*, Jan. 1994, 1(1), 1 and 10-20.

McNab, L., "Super-distribution works better in practical applications," Mar. 2, 1998, 2 pages.

Moeller, M., "NetTrust lets Cyberspace Merchants Take Account," *PC Week*, Nov. 20, 1995, 12(48), 1 page.

Moeller, M., "IBM takes charge of E-commerce; Plans client, server apps based on SET," Apr. 1996, 4 pages.

Pemberton, J., "An Online Interview with Jeff Crigler at IBM InfoMarket," Jul. 1996, 6 pages.

"LicensIt: kinder, gentler copyright? Copyright management system links content, authorship information," *Seybold Report on Desktop Publishing*, 1996, 10(11), 2 pages.

Sibert, O. et al., "The DigiBox: A Self-protecting Container for Information Commerce," *First USENIX Workshop on Electronic Commerce*, Jul. 11-12, 1995, 171-183.

Sibert, O. et al., "Securing the Content, Not the Wire, for Information Commerce," Jul. 1995, 1-11.

Stefik, M., "Trusted Systems," Mar. 1997, 8 pages.

Stefik, M., "Shifting the Possible: How Trusted Systems and Digital Property Rights Challenge us to Rethink Digital Publishing," *Technical Perspective*, 1997, 137-159.

"Rights Management in the Digital Age: Trading in Bits, Not Atoms," Spring, 1997, 4, 3 pages.

Weber, R., "Digital Right Management Technology," Oct. 1995, 35 pages.

White, S.R. et al., "ABYSS: An Architecture for Software Protection," *IEEE Trans. on Software Engineering*, Jun. 1990, 16(6), 619-629.

White, S.R. et al., "Abyss: A trusted architecture for software protection," *IEEE Symposium on Security and Privacy*, Apr. 27-29, 1987, 38-51.

Ramanujapuram, A. et al., "Digital Content & Intellectual Property Rights: A specification language and tools for rights management," Dec. 1998, 20-23 and 26.

Unknown, Optimising license checkouts from a floating license server, *ARM the Architecture for the Digital World*, http://www.arm.com/support/faqdev/1391.html.

Thompson, C.W., et al., "Digital licensing," *IEEE Internet Computing*, 2005, 9(4).

Olson, M., et al., "Concurrent access licensing," *UNIX Review*, 1988, 6(9), 67-72 (from Dialog Accession No. 01254918).

Unknown, Finland—Data fellows secures ICSA certification, *Newsbytes*, 1998, (from DialogClassic Web(TM), File 9, Accession No. 01451058, 2 pages).

Unknown, "Black box crypton defies the hackers," *Electronic Weekly*, 1985, 1257, p. 26 (from DialogClassic Web™ file 275, Accession No. 01116377).

Unknown, "Solution for piracy," *Which Computer*, 1983, p. 29 (from DialogClassic Web™ file 275, Accession No. 01014280).

From PR Newswire, "Sony develops copyright protection solutions for digital music content," 1999, http://www.findarticles.com.

From http://www.findarticles.com, "BreakerTech joins copyright management market," *Computer International*, 1999.

Kahn, R.E, "Deposit, Registration and Recordation in an electronic copyright management system," *IMA Intellectual Property Project Proceedings*, 1994, 1(1), 111-120.

"Aladdin acquires the assets of Micro Macro Technologies," *Business Wire*, 1999 http://www.findarticles.com.

U.S. Appl. No. 11/048,087, filed Feb. 1, 2005, Ravindra, et al.

"portion." Collins English Dictonary, London: Collins, 2000. Credo Reference [online] retrieved on Jun. 6, 2009]. Retrieved from <http://www.credoreference.com/entry/hcengdict/portion>.

Jones, B.L., "Mobile/PocketPC Development Jump Start", www.developer.com/ws/other/archives.php, Retrieved from the Internet Oct. 27, 2007, 17 pages.

Sun Microsystems, User's Guide Wireless Toolkit, Version 2.1, Java(tm) Platform Micro Edition, Dec. 2003, 1-89.

In the United States Patent and Trademark Office, Non Final Rejection dated Aug. 22, 2008, 12 pages, in U.S. Appl. No. 11/048,087, filed Feb. 1, 2005.

In the United States Patent and Trademark Office, Final Rejection dated Jun. 11, 2009, 17 pages, in U.S. Appl. No. 11/048,087, filed Feb. 1, 2005.

In the United States Patent and Trademark Office, Non Final Rejection dated May 28, 2008, 10 pages, in U.S. Appl. No. 11/051,162, filed Feb. 4, 2005.

In the United States Patent and Trademark Office, Final Rejection dated Nov. 13, 2008, 16 pages, in U.S. Appl. No. 11/051,162, filed Feb. 4, 2005.

In the United States Patent and Trademark Office, Advisory Action dated Feb. 25, 2009, 3 pages, in U.S. Appl. No. 11/051,162, filed Feb. 4, 2005.

In the United States Patent and Trademark Office, Non Final Rejection dated Apr. 13, 2009, 16 pages, in U.S. Appl. No. 11/051,162, filed Feb. 4, 2005.

"Portion", Collins English Dictionary, London, Collins 2000, Credo Reference, http://www.credoreference.com/entry/hcengdict/portion, Accessed Jun. 5, 2009, 1 page.

Garfinkel et al., "Terra: a virtual machine-based platform for trusted computing", 19th ACM Symposium on Operating Systems Principles, Oct. 19-22, 2003, Bolton Landing (Lake George), New York, 193-206.

Jones, "Mobile/PocketPC Development Jump Start", www.developer.com/ws/other/archives.php, Retrieved Oct. 27, 2007, 17 pages.

Koenen et al., "The Long March to Interoperable Digital Rights Management", Proceedings of the IEEE, 92(6), Jun. 2004, 15 pages.

Sun Microsystems, "User's Guide Wireless Toolkit, Version 2.1 Java(tm) Platform Micro Edition", Dec. 2003, 1-89.

* cited by examiner

SUPPLEMENTARY TRUST MODEL FOR SOFTWARE LICENSING/COMMERCIAL DIGITAL DISTRIBUTION POLICY

CROSS-REFERENCE TO RELATED APPLICATIONS

This application is related to U.S. patent application Ser. No. 11/048,087, filed Feb. 1, 2005, titled "Flexible Licensing Architecture in Content Rights Management Systems." This application is also related to U.S. patent application Ser. No. 11/051,162, filed Feb. 4, 2005, titled "Flexible Licensing Architecture in Content Rights Management Systems." The contents of both applications are hereby incorporated by reference.

FIELD OF THE INVENTION

This invention relates to a rights management (RM) system whereby access to digital content is provided only in accordance with a digital license. More particularly the invention relates to a flexible licensing architecture applicable to the licensing of a wide variety of software products through a wide variety of distribution channels, for ultimate usage in a wide variety of usage environments.

BACKGROUND OF THE INVENTION

Software piracy has grown into a billion dollar industry worldwide. One solution to this growing problem has been the use of software product activation. Typically, before the software can be executed on a user's computer, a license must first be acquired. The user may electronically send some type of identifier of the user's computer, along with some indicator of how the user desires to use the software, to a centralized licensing authority. The authority responds with a license granting the particular usage requested. The software can then be operated by the user according to the license granted by the authority.

However, there are problems associated with current software activation solutions. First, current software licenses tend to be represented in proprietary formats that vary from company to company. In some more extreme cases, the license formats may vary from product to product within the same company.

Further, for many software applications sold the product definition is not a flat structure, but rather tree like with different versions of the application featuring more or less features branching out under the base application. These versions may share the same source code of the parent application, but may be priced differently and targeted towards different users. Typical licenses are flat and therefore incapable of expressing the complex licensing requirements of these modern product definitions.

Further, as the complexity of the software licenses grow to match the complexity of the product definitions, externally validating a license by a licensing authority can become a difficult process. Sending large digitally signed licenses back and forth between a user and a licensing authority can be very bandwidth intensive. For users with slow internet connections, this can be a very time consuming task.

Therefore, what is needed is a standard license that is capable of representing the complex licensing requirements of modern software applications, while remaining suitable for on-line validation.

SUMMARY OF THE INVENTION

A flexible use licensing system for an application comprising a plurality of licensable products is provided comprising an application level product policy definition license, and a licensable product policy definition license corresponding to each licensable product. The flexible use license further comprises a rights account certificate for validating the use license against a variety of environmental conditions, and an external validation component for validating the use license at a licensing authority without the transmittal of the entire use license.

In addition, a method is provided for aggregating multiple use licenses together and determining the resulting usage rights based on an aggregation policy and priority level associate with each license.

EXEMPLARY COMPUTING ENVIRONMENT

Figure 1:
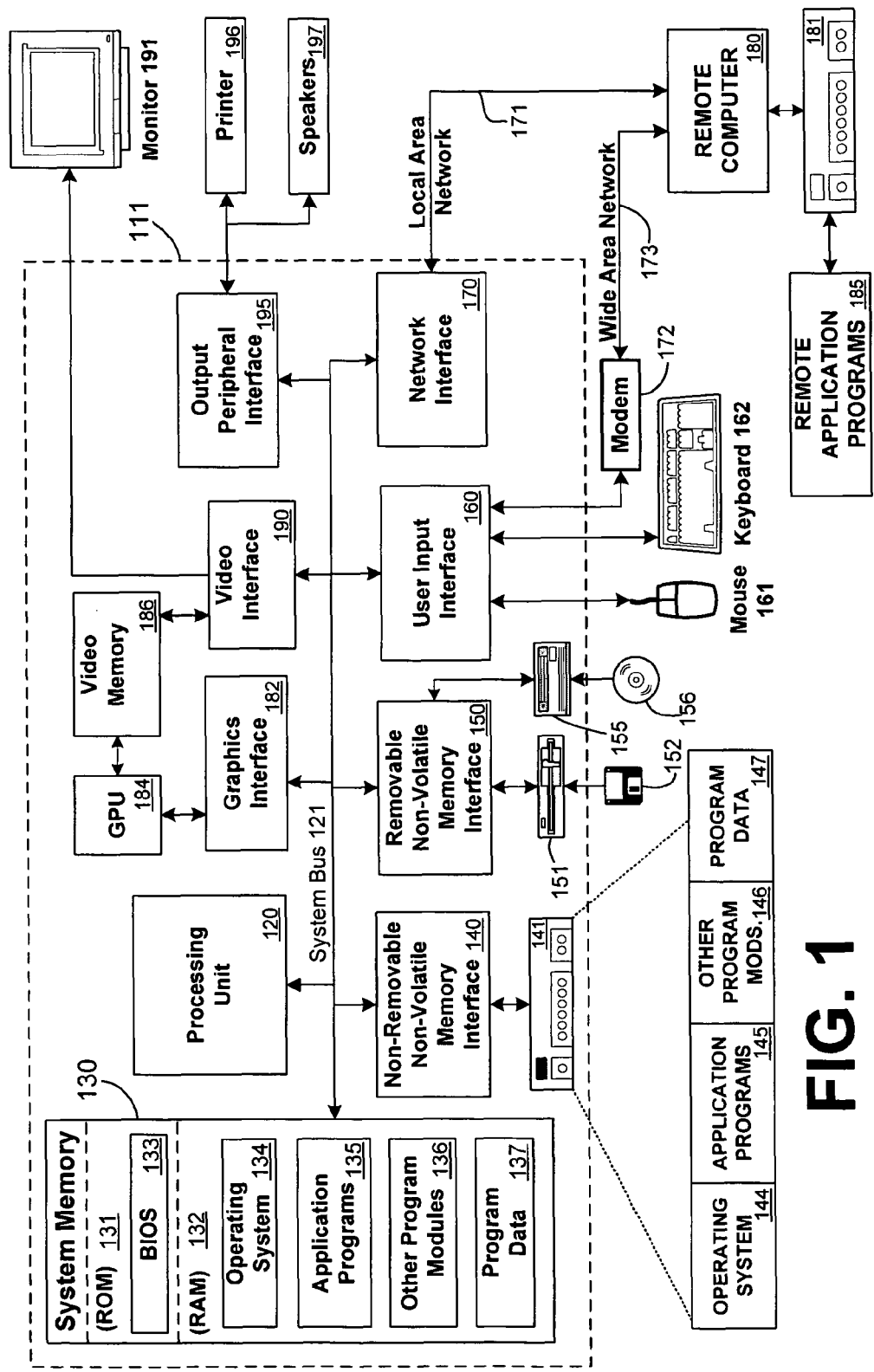
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example. Thus, the present invention may also be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 111. Components of computer 111 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 111 typically includes a variety of computer readable media. Computer readable media can be any available media that can be accessed by computer 111 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 111, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 111 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 111. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 111 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 111. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 111 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 111, although only a memory storage device 181 has been illustrated in FIG. 1. The logical connections depicted in FIG. 1 include a local area network (LAN)

171 and a wide area network (WAN) 173, but may also include other networks. Such networking environments are commonplace in offices, enterprise-wide computer networks, intranets and the Internet.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 111, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 111 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
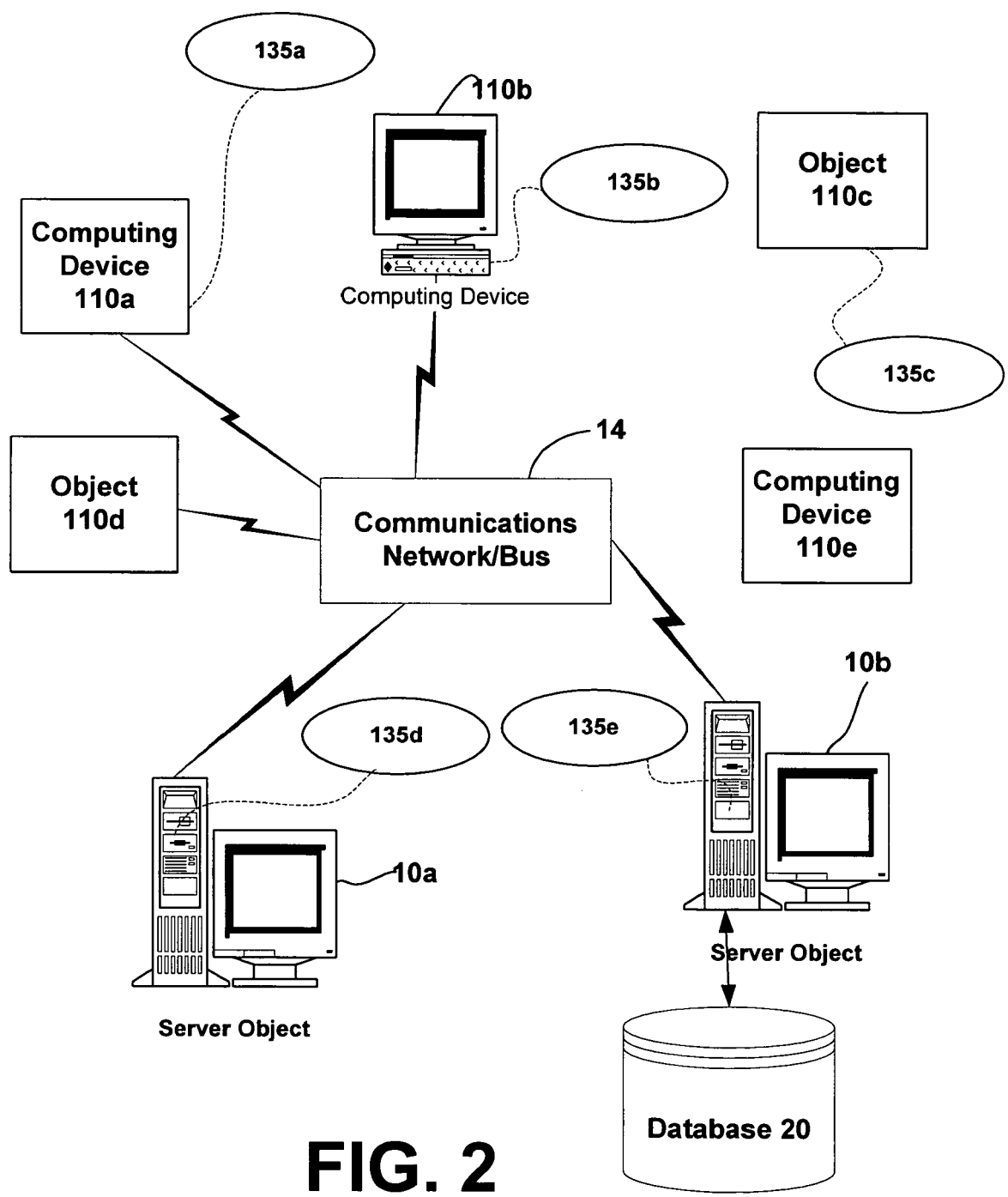
FIG. 2 is a block diagram illustrating an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as power line, data (both wireless and wired), voice (e.g., telephone) and entertainment media. Most home control devices such as light switches and appliances may use power line for connectivity. Data services may enter the home as broadband (e.g., either DSL or cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

DETAILED DESCRIPTION OF ILLUSTRATIVE EMBODIMENTS

Figure 3:
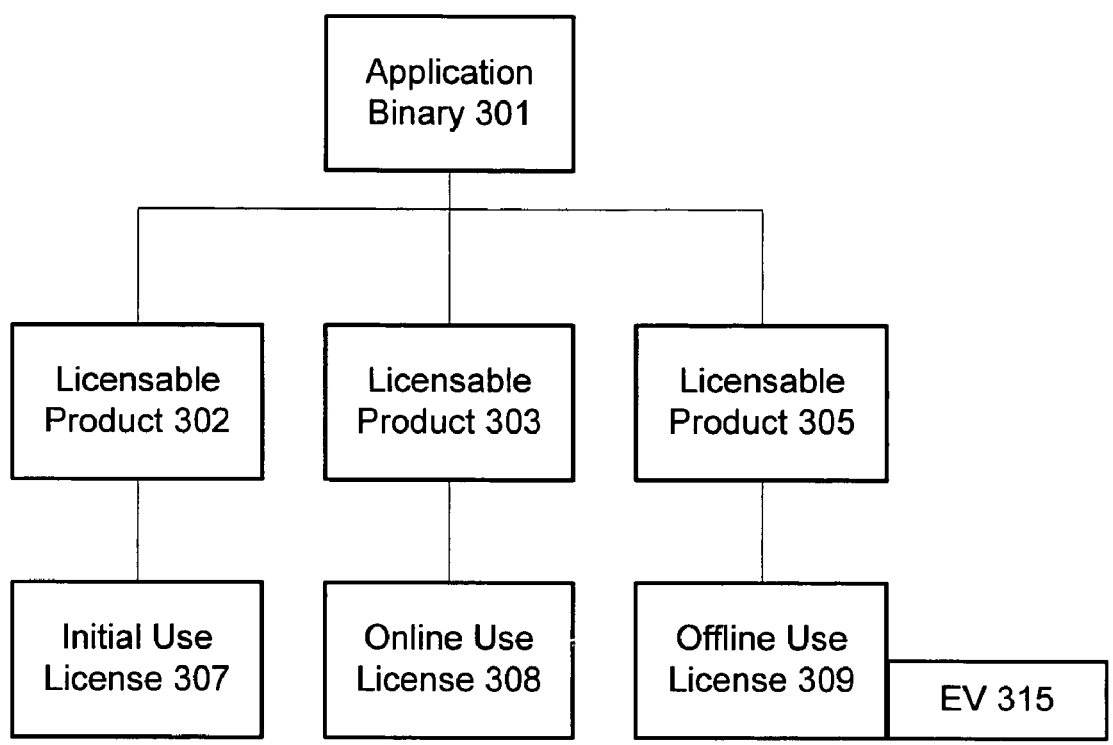
FIG. 3 is a block diagram illustrating an exemplary application hierarchy in accordance with the present invention.

FIG. 3 illustrates an exemplary application hierarchy in accordance with the present invention. As shown, the hierarchy comprises an application 301 and a collection of licensable products 302-305. Licensable products 302-305 may share the same source code as application 301, but each of licensable products 302-305 is created as a distinct product capable of being sold independently of one another. The application 301 and licensable products 302-305 may be distributed together on a compact disc, or other computer-readable medium, for example.

An example of such an application 301 may be an operating system. A particular operating system may be available in many versions, e.g., 64-bit version, foreign language version, professional version, etc. Each of these versions represents a licensable product. While each version may have distinct features, they may derive some or all of their source code from the parent application 301. A manufacturer of the application 301 can achieve savings by selling a single package comprising each of the licensable products 302-305 together and charging the purchaser only for the particular licensable product that the purchaser wishes to use. Another advantage is that if the purchaser of a particular licensable product wishes to upgrade to a more full featured version of the licensable product, the purchaser can do so without obtaining a new version of the application 301.

To facility this, each version or licensable product may have a use license shown as licenses 307-309. As shown the licenses 307-309 comprise the initial use license 307, the online use license 308, and the offline use license 309. While each licensable product is shown as having only one use license, it is not meant to limit the invention to only one license per licensable product. There is no limit to the number of licenses that each licensable product may contain.

Initial use license 307 (or out of the box license) may comprise the initial rights entitled to a user when purchasing the software application. For example, the purchaser of a server application may be provided with CD-ROM comprising several versions of the application, each version comprising more or advanced features. Accompanying the CD-ROM may be an initial use license corresponding to the version of the application with the least number of features, for example. Alternatively, the initial use license may grant the user access to a more full featured version of the application initially, and later revert to the less featured version after some introductory period has lapsed. If the purchaser later desired to upgrade to another of the licensable products, the purchaser would have to contact the publisher for a further license.

Online use license 308 may comprise a use license acquired by the user after the user has purchased a software application, over the internet for example. When the user purchases the application, the user may be required to activate the application online to receive the online use license. The user may present the manufacturer of the software application with a "proof of purchase" or some other identifier of the product. After the manufacturer authenticates the proof of purchase, the manufacturer may present the user with the online license granting the user particular rights corresponding to the proof of purchase.

Offline use license 309 may comprise a use license directed to users who are unable to validate their licenses online, for example. To facilitate this, the offline use license may comprise an external validator 315, for example. When the user purchases the product, the user may be required to first enter a number corresponding to the purchased product, for example a proof of purchase. When the user enters the number, the user may receive an second number to enter into the user's computer, for example. This second number may be related to the proof of purchase through some mathematical transformation, such as a hash function for example. This second number may be stored in a known location in the user's computer. Later, when the user attempts to use the product corresponding to the offline use license 309, the external validator 315 is encountered. The external validator 315 desirably comprises data with instruction on how to validate the offline use license. For the example described previously, this external validator may state that the hash of the proof of purchase should correspond to the value stored at the known location in the user's computer. The system can then validate the offline use license 309 by performing the hash on the proof of purchase, and checking it against the stored value as instructed by the external validator 315. The external validator is described further with respect to FIG. 6, for example.

Figure 4:
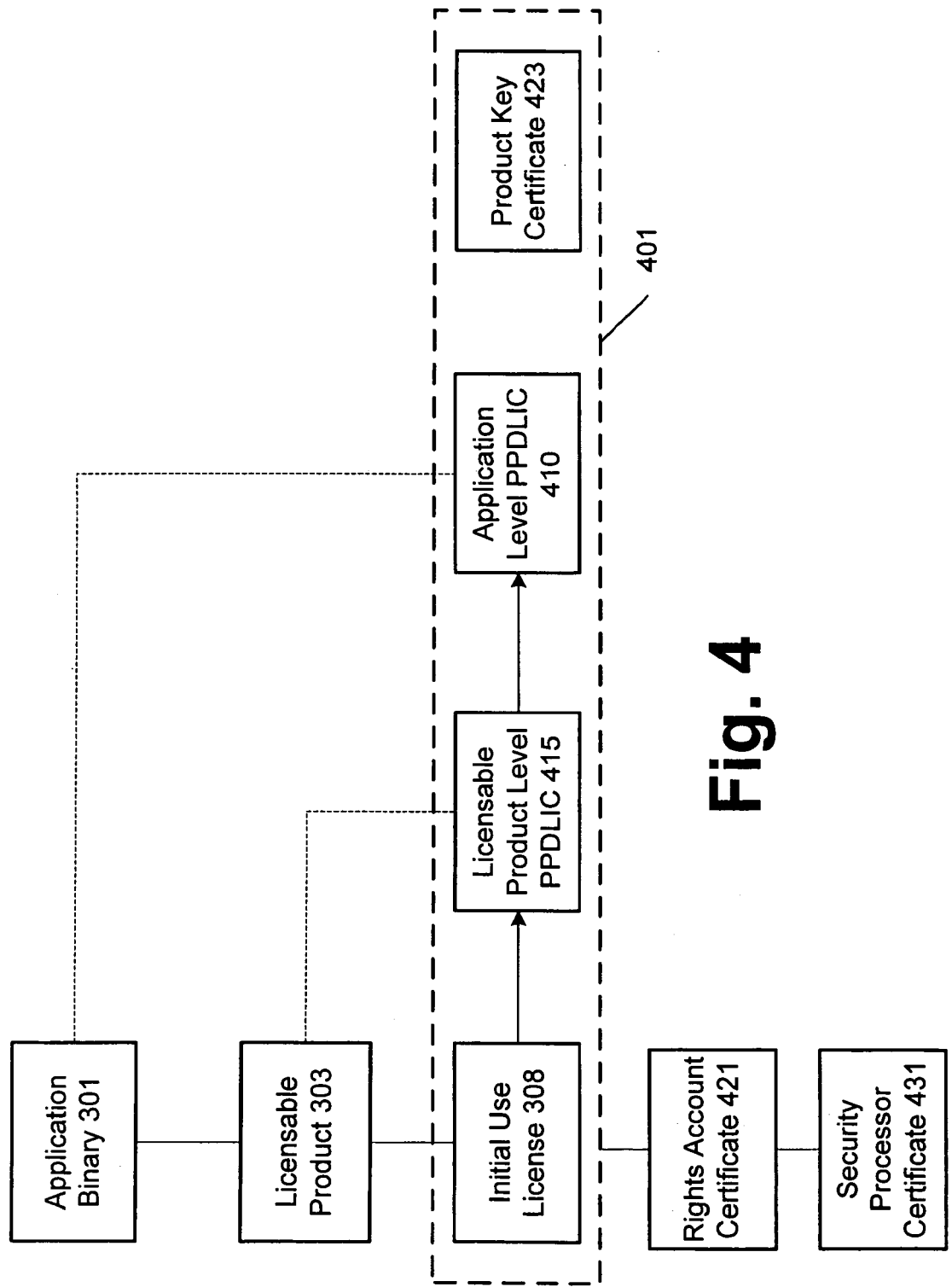
FIG. 4 is a block diagram illustrating an exemplary product policy definition license system in accordance with the present invention.

FIG. 4 is a block diagram illustrating an exemplary product license 401 in accordance with the present invention. The blocks 308, 415, 410, and 423 located inside the box bounded by the dotted lines represent the various licenses and components that may be comprised within the product license 401. In addition, on a computer containing the product license 401 there maybe optional Rights Account Certificate ("RAC") 521 and Security Processor Certificate ("SPC") 431. The SPC 431 may be used to validate the RAC 421, which may be in turn used to validate the product license 401, for example. As illustrated previously in FIG. 3, the application 301 may have a plurality of licensable products 302-305 associated with it, with each licensable product further associated with one of use licenses 307-309. For the easy of illustration only, licensable products 303 and 305, and associated use licenses, have been removed from FIG. 4. There is no limit to the number of licensable products, and associated use licenses, that can be expressed in the product license 401.

The product license 401 is desirably expressed in a general rights or policy language, such as International Standards Organization Rights Expression Language ("ISO REL"), for example. Using a general rights or policy language allows the product license 401 to be flexible and suitable for usage in a variety of possible licensing scenarios, for example. The product license 401 desirably comprises several components or licenses including use license 308, licensable product level policy product definition license ("PPDLIC") 415, application level PPDLIC 410, and product key certificate 423. While there is only one instance of each component illustrated in FIG. 4, there is no limit as to the number components or licenses that may be supported in the product license 401.

The usage rights granted in a particular licensable product level PPDLIC 415 are defined in product policies ("PP"). Each licensable product level PPDLIC 415 comprises a plurality of PPs each corresponding to a particular usage right granted in the associated application.

Similarly, application level PPDLIC 410 also comprises PPs. Initially, the particular application 301 may be distributed with only the application level PPDLIC 410. The application level PPDLIC 410 may comprise PPs corresponding to the minimum usage rights granted to a user of the application 301, for example.

Product key certificate 423 desirably comprises a proof of purchase or other identifier corresponding to the application binary, for example. Examples of product key certificates 423 are the serial numbers that often come bundled with purchased software applications, for example. These serial numbers are then entered by the user before the purchased software application can be activated. The product key certificate 423 desirably comprises data which expresses how the publisher desires the product or application to be licensed. For example, a particular product key certificate 423 may be only valid for certain products, so when the user activates this product or application the user has to have the corresponding product key certificate 423. If the application or product being activated doesn't match the particular product key certificate 423, then the operation fails and the product or application can't be activated.

As the number of licensable product level PPDLIC 415 grows and more features of an application are enabled, there may be several duplicate PPs defined across the various PPDLICs 415. In order to determine which rights the user of the application is entitled to, each PP desirably comprises a priority level, as well as an aggregation type. In a situation where two PPs conflict, the priority level and the aggregation type may be used to determine how the conflict is resolved.

For example, a user of a server product may have multiple licensable product level PPDLICs 415 associated with the server product. In one licensable product level PPDLIC 415 there may be a PP granting the user a right to five client connections. In another licensable product level PPDLIC 415 there may be a PP granting the user the right to three client connections. Depending on the aggregative type and the priority level, several different actions may be taken. If the aggregation type is "sum", then the PPs may be added together granting the user a total of eight client connections. If the type is "override", the value associated with the PP with the highest priority level may be chosen. In situations where the PP aggregation types conflict, the aggregation type in the PP with the highest priority is used. This method for aggregating conflicting PPs is described further with respect to FIG. 5.

Rights account certificate ("RAC") 421 comprises an environmental binder used to associate the product policy license 401 with a particular user, computer, network, or any other piece of data that a publisher may wish to restrict the usage of the application 301 to. The RAC 421 may be associated with several licenses, and may be used to authenticate a particular license before a particular usage can be granted. The RAC 421 may be implemented according to the methods described in pending U.S. patent application Ser. No. 11/048,087. The RAC 421 may contain an identifier corresponding to a particular hardware identification number, for example.

In addition to the hardware identification number, the RAC 421 may comprise an identifier corresponding to some particular network characteristics, for example. When the user initially received the particular RAC 421, the user may have provided to a licensing authority, either with or without their knowledge, some identifier or characteristic associated with the user's network environment, for example. Before a particular usage of an application is allowed, the presence of the particular network characteristic is verified. For example, in a corporate environment, the network characteristic may have been provided corresponding to the corporate network, thus preventing the user from making use of the product when not in the office. Examples of network characteristics may include the number of domain controllers, a DNS name, an IP address, or any other network characteristics known in the art.

The RAC 421 may also comprise an identifier corresponding to an original equipment manufacturer ("OEM") specified computer characteristics. OEMs often bundle software with a purchase of one of their computers. The supplier of the software often provides the software to the OEM at a volume discount, and may desire that the software not be resold or redistributed by the purchaser of the computer and compete with the supplier's full priced software in the marketplace. Instead of requiring the purchaser of the computer go through some series of steps to obtain licenses for the purchased software, but at the same time prevent the purchaser from selling the bundled software and license to another user, the RAC 421 may comprise some identifier corresponding to the particular characteristics of the OEM computer. This identifier may correspond to some value associated with the BIOS, for example. The OEM bindings may be implemented using any system known in the art for describing a hardware system and correlating that description to a particular OEM. The particular OEM characteristics to be used in the RAC 421 can be provided to the software manufacture by the OEM, and then incorporated into the RAC 421 by the software manufacturer before the software is installed in the OEM computer.

When the purchaser of the OEM computer attempts to use the installed software, the OEM characteristics listed in the RAC 421 will be validated against the user's computer OEM characteristics, and only if the OEM characteristics match will the requested software usage be permitted.

The Security Processor Certificate ("SPC") 431 may be used to authenticate the RAC 421. As described above, the RAC 421 is used to authenticate the product licenses 401 associated with application binary 301. Similarly, the SPC 431 is used to authenticate the RAC 421. The SPC 431 may be used to authenticate the RAC 421 using any system, method or technique known in the art for authentication. For example, the SPC 431 may contain an signed value that can be compared against a value stored in the user's processor. If after decrypting the signed value, it matches the stored value, the RAC 421 is declared authentic.

Figure 5:
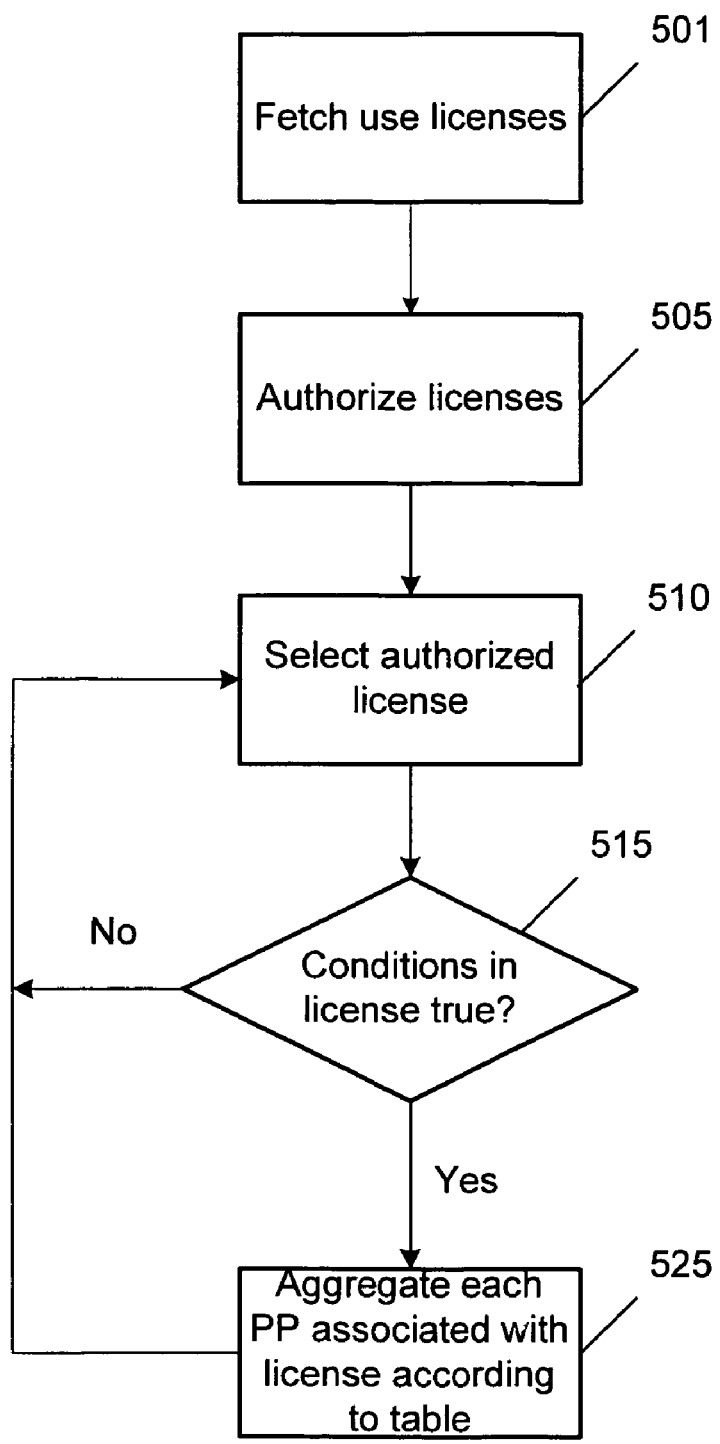
FIG. 5 is a block diagram illustrating an exemplary method of aggregating use licenses in accordance with the present invention.

FIG. 5 is a flow diagram of an exemplary method of license aggregation in accordance with the present invention. A set of use licenses for a particular application is fetched. The use licenses are authorized. Any condition associated with each of the use licenses is verified. If the conditions, if any, are verified, then each product policy ("PP") associated with each verified use license is aggregated. If the conditions are not verified then the license is ignored for aggregation purposes, and the next license from the set of authorized licenses is evaluated. The embodiment continues until each license has been evaluated.

At 501, a user or administrator has selected an application to use. To determine what rights the user has been granted with respect to the application, any license associated with this application is desirably retrieved. As described previously with respect to FIG. 4, there may be several licenses associated with a particular application. Each license may comprise conditions that should be satisfied before allowing the use of the application or a particular feature of the application (e.g., time or payment condition). Each license may also have one or more policy products ("PP") granting a particular usage right related to the application. Because each license may comprise several overlapping PPs, it may be necessary to aggregate the PPs to determine exactly what usage rights associated with the application the user may be entitled to. Accordingly, each PPDLIC comprising the PPs associated with a particular application are desirably retrieved. The PPDLICs may be retrieved from a token store or other centralized location on the user's computer where licenses may be stored, for example.

At 505, the licenses are authorized. The licenses may be authorized using any of the methods for license validation, such as the RAC 421 for example. Authorizing the licenses ensures that the licenses are valid and have not been transferred from another user, for example. Any licenses that cannot be authorized is desirably removed from the set of licenses being considered.

At 510, an authorized license is selected. Because the licenses are ultimately aggregated together, there is no particular order required for the selection of the licenses. Any system, method, or technique known in the art may be used.

At 515, it is determined if any conditions in the selected license are met. As described previously, with respect to FIG. 3, there may be optional conditions associated with a given license. For example, if the license associated with a particular licensable product specifies a thirty day trial period, then there may be a condition that specifies a date that the license is set to expire. If all of the conditions in the selected license, if any, are met, then the embodiment continues at 525. Else the embodiment returns to 510 to select a different license.

At 525, the PPs associated with the selected license are desirably aggregated with previously aggregated PPs. Previously aggregated PPs may be stored in a cache, for example. As described previously, the same PP may be associated with multiple licenses. A typical PP, as expressed in ISO REL for example, comprises an aggregation priority and an aggregation type. The aggregation type specifies how this particular PP should be aggregated with PPs specifying the same usage right. The aggregation priority is used to determine which PP has priority for certain aggregation types. An example PP is illustrated below:

```
<sl:productPolicies>
    <sl:priority>2.26</sl:priority>
    <sl:policySum name="Maximum Connections">3</sl:policySum>
</sl:productPolicies>
```

The illustrated PP has a priority of 2.26 and an aggregation type of sum. The aggregation policy type of sum specifies that the usage right associated with the PP should be added to the usage right associated with any previous PPs specifying the same usage right in the cache, for example. The aggregation policy associated with each aggregation type is illustrated in the table T1 below.

TABLE T1

| Aggregation Type | Aggregation Policy |
|---|---|
| Minimum | The value of the PP containing the arithmetic minimum is used |
| Maximum | The value of the PP containing the arithmetic maximum is used |
| Sum | The sum of all the PP values is used |
| Boolean | The logical OR of the PP values is used |
| Override | The PP value with the highest associated priority is used |

Each PP associated with the license considered in turn. If a PP specifying the same usage right has not yet been considered by the embodiment (i.e., it is not yet in a cache comprising all of the previously considered PPs), then the PP is placed in the cache and no action need be taken. Else, a PP specifying the same usage right is in the cache and the current PP is desirably aggregated with the PP in the cache according to the aggregation type specified in the PP and, depending on the aggregation type, according to the priority level associated with the selected PP.

If the aggregation type is "Minimum", then the value of the PP with the arithmetic minimum is placed in the cache.

If the aggregation type is "Maximum", then the value of the PP with the arithmetic maximum is placed in the cache.

If the aggregation type is "Sum", then the value of the current PP is summed with the value of the PP in the cache, if any.

If the aggregation type is "Boolean", then the logical OR of the PP values in the cache is used.

If the aggregation type is "Override", then the value from the PP in the cache with the highest aggregation priority is used.

While the current example is illustrated using the five previously described aggregation types, it is not meant to limit the invention to those types described. The invention is capable of supporting any known system, method, or technique known in the art for aggregating values.

After considering all of the PPs associated with the selected license, the embodiment selects the next license at 510. The embodiment continues to aggregate PPs from the remaining licenses until there are no remaining licenses. After exhausting the license, the usage rights available to the user for the particular application can be found in the remaining aggregated PPs stored in the cache.

Figure 6:
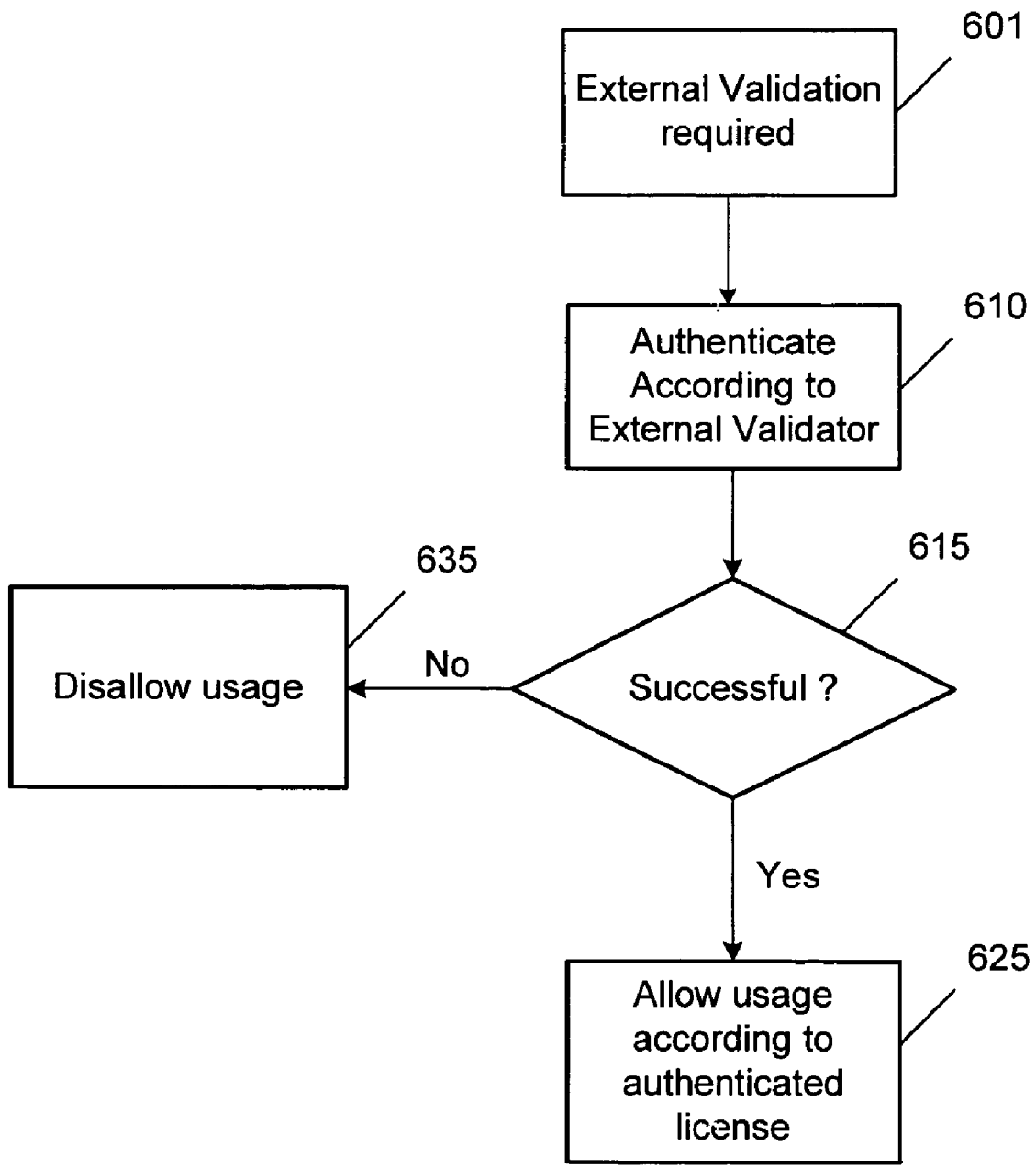
FIG. 6 is a flow diagram illustrating an exemplary method for externally validating a license in accordance with the present invention.

FIG. 6 is a flow diagram of an exemplary method of external validation in accordance with the present invention. An external validation indicator for a use license is encountered. The associated external validator is examined. The use license is authenticated according to the external validator. If the validation is successful, then the usage as described in the use license is allowed. Else, the usage is denied.

At 601, a user may have attempted to use a particular licensable product. The licensable product may correspond to licensable product 305, as described with respect to FIG. 3 for example. As shown, licensable product 305 has a corresponding offline use license 309. Offline use license 309 has an associated external validator 315.

When the user attempts to use the licensable product 305, the offline use license 309 is retrieved from the license store. As described previously, the licenses are desirably represented using a general rights or policy language, such as ISO REL. When the license is interpreted, a field or flag corresponding to the external validator 315 may be encountered. The presence of the field indicates that this offline use license must be verified according to an associated external validator 315. The external validator 315 comprises data that is appended to, or otherwise associated with the offline use license 309.

As described previously with respect to FIG. 3, the external validator 315 desirably comprises data indicating how the offline use license 309 may be validated. When the user originally purchased the licensable product 305 corresponding to the offline use license 309, the user may have provided, via the telephone for example, a number corresponding to a proof of purchase to a producer of the licensable product 305. In return, the user may have been provided with a short number corresponding to the proof of purchase. The number may be the hash of the proof of purchase, for example. This number may have been entered by user, and stored in a location on the computer known to the external validator 315, for example. The external validator 315 may comprise instructions to compare the hash of the proof of purchase with this stored number, and only allow usage if the hash matches the stored number. Because a user does not know the hash function used by the manufacturer, the user would not be able to recreate the stored number from the proof of purchase. In addition to the hash function, the stored number may be authenticated using a variety of methods, including digital signatures, for example.

At 610, the use license 309 is authenticated according to the external validator 315. As described above the external validator 315 may comprise data instructing how the use license 309 can be authenticated. Alternatively, the external validator 315 may comprise a pointer or memory address on the user's computer corresponding to the instructions for validation. Any system, method, or technique known in the art for validation may be used.

At 615, it is determined if the offline use license 309 was successfully validated. If the license was successfully authenticated, then the embodiment may proceed to 625 where the usage specified in the offline use license 309 is allowed. Else, the offline use license 309 was not authenticated, and usage is disallowed at 635.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for using a licensing architecture domain to minimize the amount of resources impacted in authorizing a request to use a software product, the method being implemented on a computer and comprising:
    the computer receiving the request to use the software product;
    the computer retrieving product policies from one or more licenses, each product policy granting a usage right and having an aggregation type that specifies how each product policy should be aggregated with other product policies;
    the computer aggregating the product policies according to the aggregation type to determine permitted usages in the one or more licenses without contacting a licensing authority, said aggregating comprising authenticating the retrieved licenses and only aggregating the product policies when the retrieved licenses are successfully authenticated; and
    the computer allowing the requested usage when the requested usage complies with the permitted usages.

2. The method of claim 1, further comprising the computer allowing the requested usage when it is determined by the computer that the requested usage complies with the permitted usages.

3. The method of claim 1, wherein aggregating the product policies comprises aggregating product policies granting the same usage right.

4. The method of claim 3, wherein each product policy further comprises an aggregation priority, wherein the product policies granting the same usage right are aggregated according to the aggregation type and the aggregation priority of the product policies.

5. The method of claim 4, wherein the aggregation type is one of sum, maximum, minimum, override, and boolean.

6. The method of claim 1, wherein the retrieved licenses are expressed in the international standards organization rights expression language (ISO REL).

7. A method for using a licensing architecture domain to minimize the amount of resources impacted in externally validating a product license corresponding to a software product, the method being implemented on a computer and comprising:
- the computer receiving a request to use the software product;
- the computer retrieving the product license, the product license being issued to the computer and including external validation data;
- the computer retrieving product policies from the product license, each product policy granting a usage right and having an aggregation type that specifies how each product policy should be aggregated with other product policies;
- the computer validating the product license according to the external validation data;
- the computer aggregating the product policies according to the aggregation type to determine permitted usages in the product license without contacting a licensing authority, said aggregating comprising authenticating the retrieved licenses and only aggregating the product policies when the retrieved licenses are successfully authenticated; and
- the computer permitting usage of the software product according to the product license when the product license is successfully validated.

8. The method of claim 7, wherein validating the product license according to the external validation data comprises performing a function indicated by the external validation data on a first value indicated by the external validation data to generate a result, comparing the result with a second value indicated by the external validation data, and validating the product license when the result matches the second value.

9. A computer-readable storage medium having stored thereon computer-executable instructions implementing a method for using a licensing architecture domain to minimize the amount of resources impacted in authorizing a request to use a software product, the method being implemented on a computer executing said computer-executable instructions and comprising:
- receiving the request to use the software product;
- retrieving a product license associated with the software product the product license being issued to the computer and including external validation data;
- retrieving product policies from the product license, each product policy granting a usage right and having an aggregation type that specifies how each product policy should be aggregated with other product policies;
- validating the product license according to the external validation data;
- aggregating the product policies according to the aggregation type to determine permitted usages in the product license contacting a licensing authority, said aggregating comprising authenticating the retrieved licenses and only aggregating the product policies when the retrieved licenses are successfully authenticated;
- permitting usage of the software product according to the product license when the product license is successfully validated.

10. The medium of claim 7, wherein validating the product license according to the external validation data comprises performing a function indicated by the external validation data on a first value indicated by the external validation data to generate a result, comparing the result with a second value indicated by the external validation data, and validating the product license when the result matches the second value.

11. A computer-readable storage medium having stored thereon computer-executable instructions implementing a method for using a licensing architecture domain to minimize the amount of resources impacted in authorizing a request to use a software product, the method being implemented on a computer executing said computer-executable instructions and comprising:
- receiving the request to use the software product;
- retrieving product policies from one or more licenses, each product policy granting a user right and having an aggregation type that specifies how each product policy should be aggregated with other product policies;
- aggregating the product policies according to the aggregation type to determine-permitted usages in the one or more licenses without contacting a licensing authority, said aggregating comprising authenticating the retrieved licenses and only aggregating the product policies when the retrieved licenses are successfully authenticated; and
- allowing the requested usage when the requested usage complies with the permitted usage.

12. The medium of claim 11, wherein aggregating the product policies comprises aggregating product policies granting the same usage right.

13. The medium of claim 12, further comprises an aggregation priority, wherein the product policies granting the same usage right are aggregated according to the aggregation type and aggregation priority of the product policies.

14. The medium of claim 13, wherein the aggregation type is one of sum, maximum, minimum, override, and boolean.

15. The medium of claim 11, wherein the retrieved licenses are expressed in the international standards organization rights expression language.

* * * * *